(12) United States Patent
Krais et al.

(10) Patent No.: US 11,515,744 B2
(45) Date of Patent: Nov. 29, 2022

(54) STATOR HOUSING FOR AN ELECTRIC MACHINE, ELECTRIC MACHINE, AND VEHICLE

(71) Applicant: VALEO SIEMENS EAUTOMOTIVE GERMANY GMBH, Erlangen (DE)

(72) Inventors: Nils Krais, Strahlungen (DE); Philipp Söntgerath, Niederkrüchten (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 260 days.

(21) Appl. No.: 16/907,635

(22) Filed: Jun. 22, 2020

(65) Prior Publication Data

US 2020/0403464 A1 Dec. 24, 2020

(30) Foreign Application Priority Data

Jun. 24, 2019 (DE) ...................... 10 2019 116 941.0

(51) Int. Cl.
*H02K 1/20* (2006.01)
*B60K 1/00* (2006.01)
*H02K 9/19* (2006.01)
*H02K 5/20* (2006.01)

(52) U.S. Cl.
CPC .................. *H02K 1/20* (2013.01); *B60K 1/00* (2013.01); *H02K 5/203* (2021.01); *H02K 9/19* (2013.01)

(58) Field of Classification Search
CPC ............... H02K 1/20; H02K 9/19; B60K 1/00
USPC .......................................................... 310/54
See application file for complete search history.

(56) References Cited

FOREIGN PATENT DOCUMENTS

EP 2701286 A2 * 2/2014 ............... H02K 5/20

* cited by examiner

*Primary Examiner* — Terrance L Kenerly
(74) *Attorney, Agent, or Firm* — Manabu Kanesaka (57) ABSTRACT

A stator housing for an electric machine, includes a cooling channel through which a cooling fluid may flow and which has a plurality of main portions extending in the axial direction or in the circumferential direction, wherein adjacent main portions are connected by deflection portions of the cooling channel in such a way that a meandering cooling path is formed, wherein a guide element is formed within each of the deflection portions and separates the cooling path into two cooling sub-paths.

16 Claims, 8 Drawing Sheets

STATOR HOUSING FOR AN ELECTRIC MACHINE, ELECTRIC MACHINE, AND VEHICLE

RELATED APPLICATIONS

The present application is based on, and claims priority from, German Application No. DE 10 2019 116 941.0 filed Jun. 24, 2019, the disclosure of which is hereby incorporated by reference herein in its entirety.

The present invention relates to a stator housing for an electric machine, comprising a cooling channel through which a cooling fluid may flow and which has a plurality of main portions extending in the axial direction or in the circumferential direction, wherein adjacent main portions are connected by deflection portions of the cooling channel in such a way that a meandering cooling path is formed.

The invention also relates to an electric machine and a vehicle.

During operation of electric machines, electrical losses typically behave proportionally to the supplied stator current. Heat is generated due to electrical winding resistances of the stator windings and, at high currents, may lead to a thermal fault of the stator winding. In order to increase the utilisation of the electric machine, it is therefore necessary to cool the machine.

In machines with high utilisation, this is typically achieved by means of a cooling fluid, in particular by means of a water cooling. To this end, it is known, in a stator housing, to provide a cooling channel through which the cooling fluid may flow and which has a meandering cooling path. The cooling channel for this purpose consists of main portions which extend in the axial or in the circumferential direction and which are connected in pairs by deflection portions. In this case, a pressure drop across the cooling path typically increases with increasing length of the cooling path or with the number of main portions and/or with the volume flow of the cooling fluid.

Consequently, the object of the invention is to describe a possibility for cooling an electric machine with which a pressure drop across a meandering cooling path is reduced.

This problem is achieved in accordance with the invention in a stator housing of the kind described at the outset in that a guide element is formed within each of the deflection portions and separates the cooling path into two cooling sub-paths.

The invention is based on the finding that a pressure drop across the cooling path is caused quite significantly by a flow separation in the region of the deflection portions which may be significantly reduced by dividing the cooling path into the cooling sub-paths. It should be ensured here that the reduction of the pressure drop brought about by the separation of the cooling path into the cooling sub-paths is much greater than the minor increase of the pressure drop caused by the reduction of the flow cross-section on account of the addition of the guide elements.

The stator housing according to the invention consequently enables a significant reduction of the pressure drop across the meandering cooling path and for example thus allows the use of less powerful pumps for the cooling fluid, or an increase of the volume flow of the cooling fluid and/or an increase of the number of the main portions with the same pressure drop, as compared to a conventional stator housing without guide elements.

The deflection portions are typically designed to realise a deflection of the cooling fluid by at least 170°, preferably at least 175°, particularly preferably at least 179°. The cooling channel preferably has an inlet, which is connected to a first main portion on the basis of a flow direction of the cooling fluid, and/or an outlet, which is connected to a final main portion on the basis of the flow direction of the cooling fluid.

It is preferably provided in the stator housing according to the invention that a second guide element is formed within each of the deflection portions and separates the cooling path into a further cooling sub-path.

It may also be provided that the second guide element runs coaxially and/or parallel to the first guide element. In this case, a coaxial course typically relates to those portions of the guide elements that have a circular arc-like form, and a parallel course relates to those portions of the guide elements that have a straight course.

In a preferred embodiment it is provided that the, or a, guide element follows the course of an outer and/or an inner edge of the cooling channel. The geometry of the deflection portion is thus advantageously transferred to the geometry of the guide element.

The, or a, guide element is typically circular arc-shaped at least in some sections. In this case, the guide element may be completely circular arc-shaped. It is also possible that the guide element has a straight extension portion at one or at each end of the circular arc-shaped portion, which extension portion extends preferably into a main portion.

The guide element expediently extends into the main portions connected by the deflection portion to an extent of at most 25%, preferably at most 10% of the length of the main portions connected by the deflection portion. It may also be provided that the guide element does not extend into the main portions connected by the deflection portion.

In order to achieve a uniform separation of the cooling path, it is expedient if the guide element or the guide elements is or are arranged centrally in the cooling channel.

In the case of the stator housing according to the invention, it is preferred if one guide element of a deflection portion separates the cooling sub-paths in fluid-tight fashion in such a way that a cooling fluid flow transverse to the flow direction of the cooling fluid through the cooling channel is prevented. Partial flow separations in the transverse direction are thus avoided. It is also possible that all guide elements of a deflection portion separate the cooling sub-paths in fluid-tight fashion.

In accordance with one particular embodiment, it is provided that one guide element of a deflection portion has an aperture, in particular a central aperture, through which two of the cooling sub-channels are fluidically connected to one another. It is also possible that all guide elements of a deflection portion have an aperture.

In the stator housing according to the invention a deflection portion is preferably provided in the form of a sector of a ring.

In accordance with an alternative preferred embodiment it is provided that a deflection portion has a first outer edge portion running transverse to the direction of extent of the main portions and second outer edge portions which connect the first outer edge portion to edges of the main portions connected by the deflection portion. The first outer edge portion typically extends over at least 25%, preferably 50% of the distance between the edges of the main portions. The second outer edge portions may be rounded and/or may extend along the direction of extent of the main portions.

The stator housing according to the invention may be manufactured particularly easily if the main portions and the deflection portions are formed by a cavity in the stator housing. For example, the cavity may be milled into a material of the stator housing. Alternatively, it is also possible that the cooling channel is formed by a pipe at least in the region of the cooling path.

The stator housing according to the invention preferably comprises an inner housing element and an outer housing element, wherein the inner housing element is arranged coaxially within the outer housing element. The stator housing may thus advantageously be produced in modular form.

The cavity is preferably formed in one of the housing elements. In this case, it may be provided that the cavity is formed in the inner housing element and is closed by the outer housing element or that the cavity is formed in the outer housing element and is closed by the inner housing element.

In addition, it may be provided that one of the housing elements comprises a first end plate and the other housing element comprises a second end plate of the stator housing. The inlet and/or the outlet is preferably formed integrally with the outer housing element. The inlet and the outlet may be provided at opposite axial positions of the stator housing.

The object of the invention is also achieved by an electric machine for a vehicle, comprising a stator housing according to the invention and a stator which is arranged within the stator housing.

The object of the invention is also achieved by vehicle comprising an electric machine according to the invention which is designed to drive the vehicle.

All embodiments of the stator housing according to the invention may be transferred analogously to the electric machine according to the invention and the vehicle according to the invention, such that the above-mentioned advantages may be attained with them as well.

Figure 1:
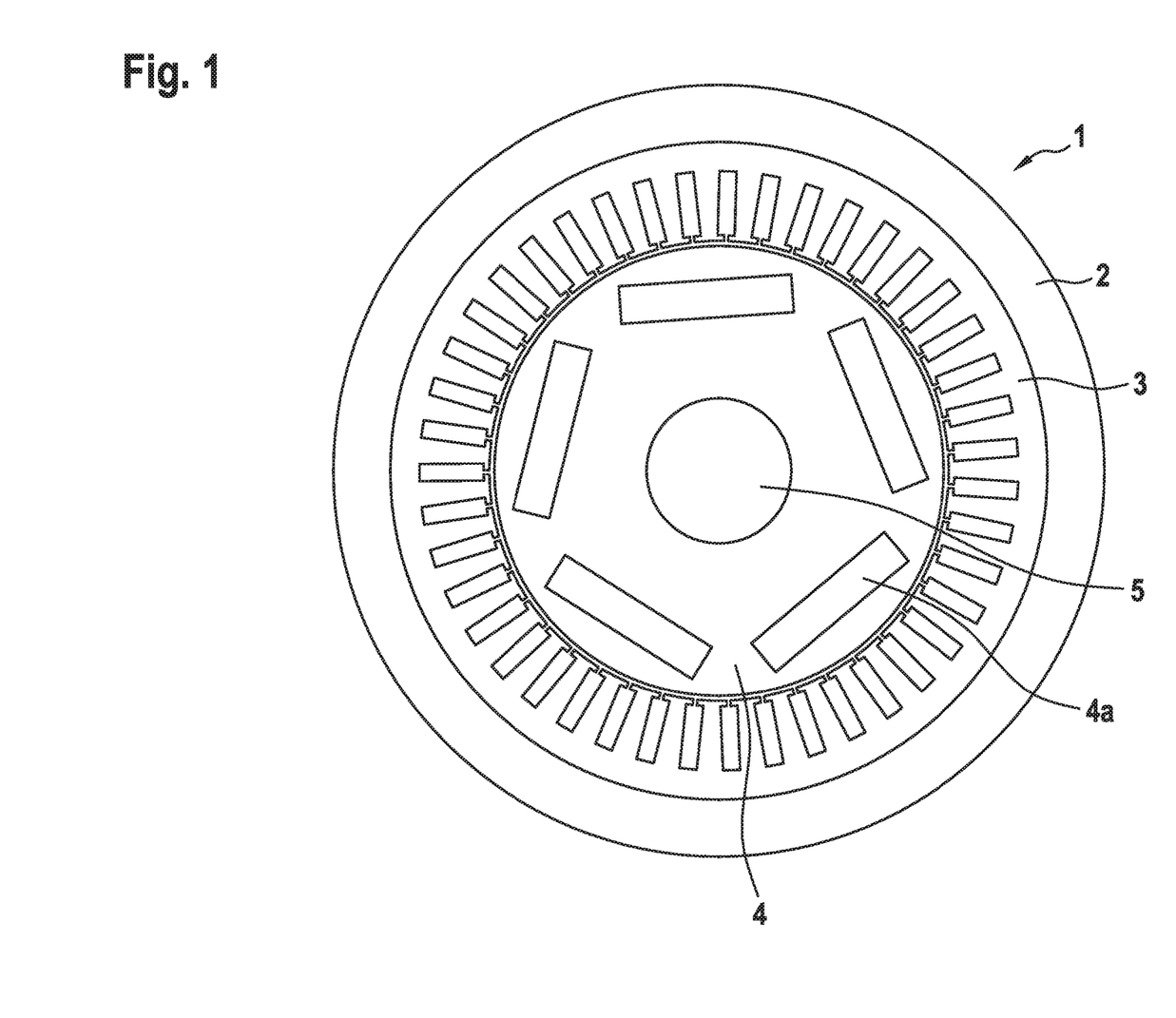
FIG. 1 a schematic diagram of a first exemplary embodiment of the electric machine according to the invention with a first exemplary embodiment of the stator housing according to the invention.

Further advantages and details of the present invention will become clear from the exemplary embodiments described hereinafter and also on the basis of the drawings. The drawings are schematic illustrations and show:

FIG. 1 is a schematic diagram of a first exemplary embodiment of an electric machine 1 with a first exemplary embodiment of a stator housing 2.

The electric machine 1 also comprises a stator 3, which is arranged in the stator housing 2 by means of a press fit. A rotor 4 with permanent magnets 4a is arranged within the stator 3 and is connected to the shaft 5 for conjoint rotation.

Figure 2:
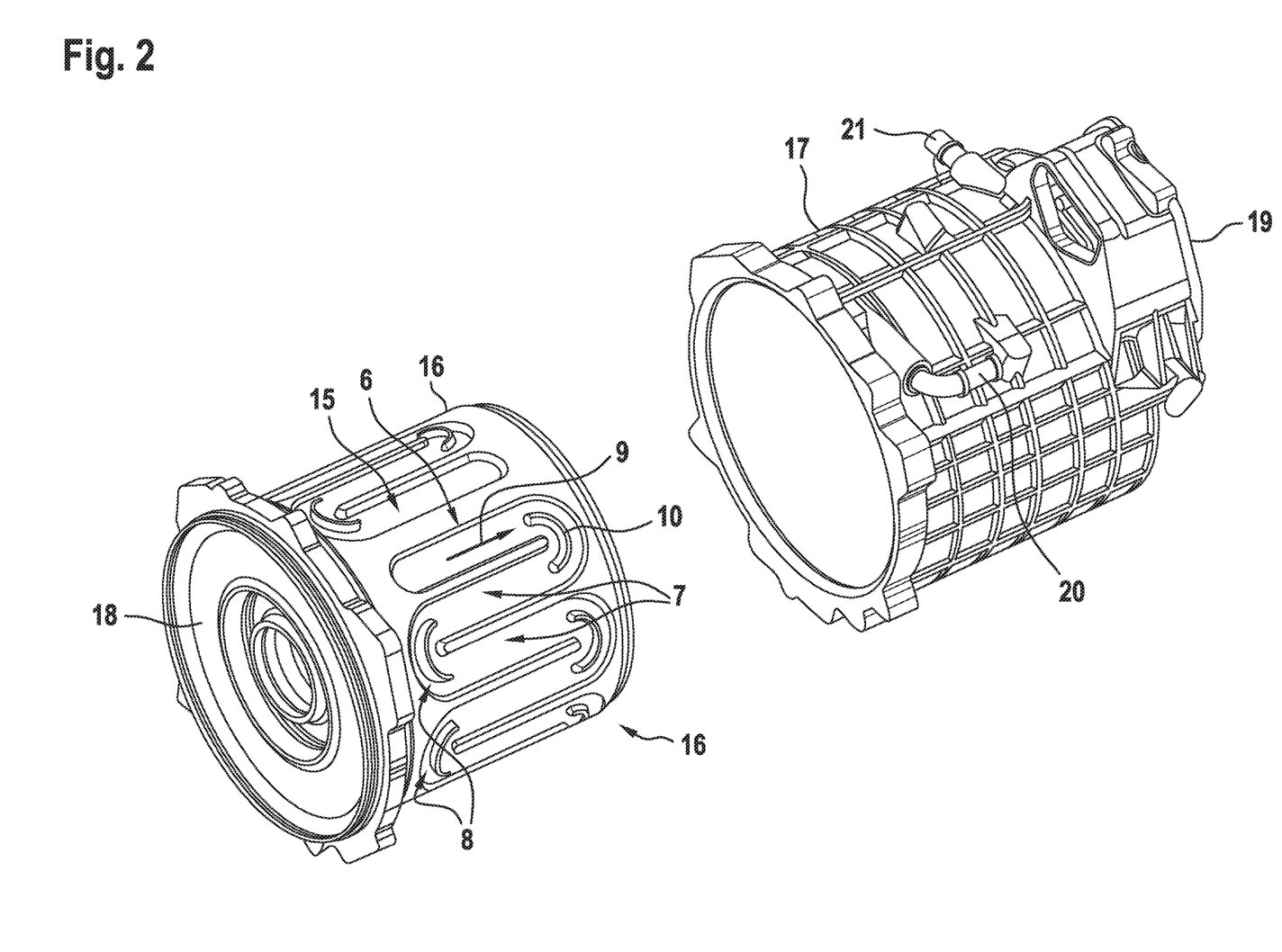
FIG. 2 shows an exploded illustration of the stator housing.

FIG. 2 is an exploded illustration of the stator housing 2.

The stator housing 2 comprises a cooling channel 6 through which a cooling fluid may flow and which has a plurality of main portions 7 extending in the axial direction and a plurality of deflection portions 8. The deflection portions 8 in this case connect adjacent main portions 7 in such a way that a meandering cooling path 9 is formed. The deflection portions 8 are arranged here alternately at opposite axial positions of the stator housing 2.

Figure 3:
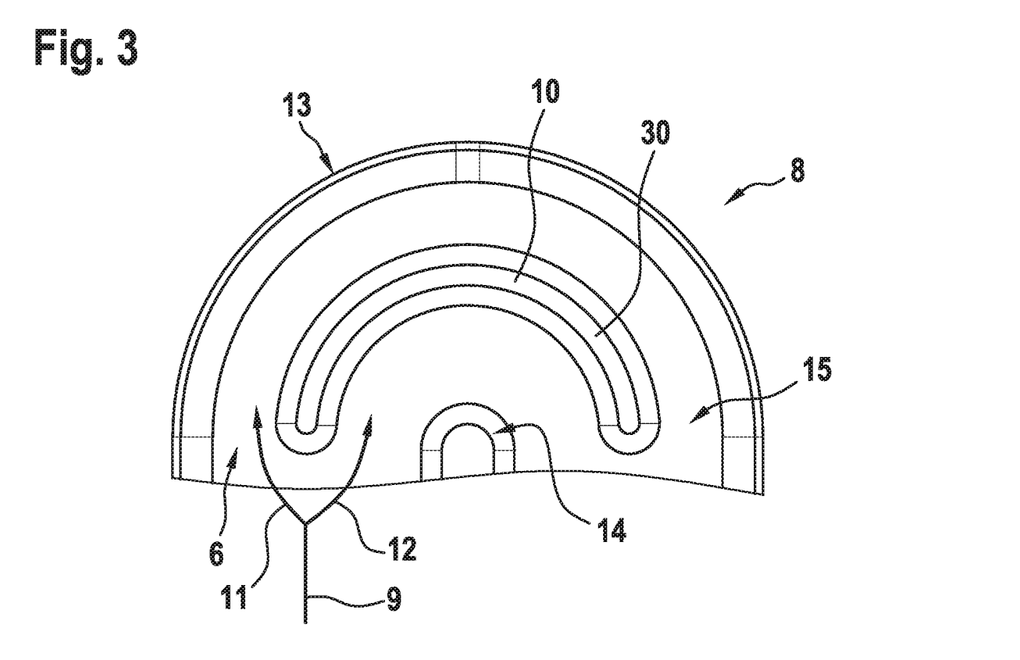
FIG. 3 shows a detailed view of a deflection portion of the stator housing.

FIG. 3 is a detailed view of a deflection portion 8 of the stator housing 2.

A guide element 10 is formed within the deflection portion 8 and separates the cooling path 9 into two cooling sub-paths 11, 12. In this case, the guide element 10 follows the course of an outer edge 13 and an inner edge 14 of the cooling channel 6. The deflection portion 8 is clearly provided in the form of a sector of a ring, and the guide element 10 arranged in the deflection portion is in the form of a circular arc. In other words, the guide element is formed from a circular arc-shaped portion 30. The guide element 10 is arranged centrally in the cooling channel 6. In the present exemplary embodiment the guide element 10 does not extend into the adjacent main portions 7. However, it is alternatively also possible that the guide element extends partially into the main portion 7, for example to an extent of 10% of the length of the main portion 7. It can be seen that the deflection portion 8 is formed by a cavity 15 in the stator housing. It is again visible with reference to FIG. 2 that the main portions 7 are also formed by the cavity 15.

FIG. 2 also shows an inner housing element 16 and an outer housing element 17 of the stator housing 2. In an assembled state of the stator housing 2, the inner housing element 16 is arranged coaxially within the outer housing element 17. The cavity 15 is formed in the inner housing element 16 and is closed by the outer housing element 17. In accordance with an alternative exemplary embodiment, the cavity 15 is formed in the outer housing element 17 and is closed by the inner housing element 16. In this case, the guide element 10 is formed such that it separates the cooling sub-paths 11, 12 fluidically in such a way that a cooling fluid flow transverse to the flow direction of the cooling fluid through the cooling channel 6 is prevented. In the present exemplary embodiment, this means that the guide elements extend radially to such an extent that they reach the outer housing element 17.

The inner housing element 16 also has a first end plate 18 on one end face of the stator housing 2, through which the shaft 5 (see FIG. 1) may be guided. The outer stator housing 17, on the other end face, has a second end plate 19, which carries a further bearing for the shaft 5 (see FIG. 1).

In addition, the outer housing element 17 has an inlet 20, which is fluidically connected to a first main portion 7, and an outlet 21, which is fluidically connected to a last main portion 7. The terms "first main portion" and "last main portion" relate here to the flow direction of the cooling fluid.

Figure 4:
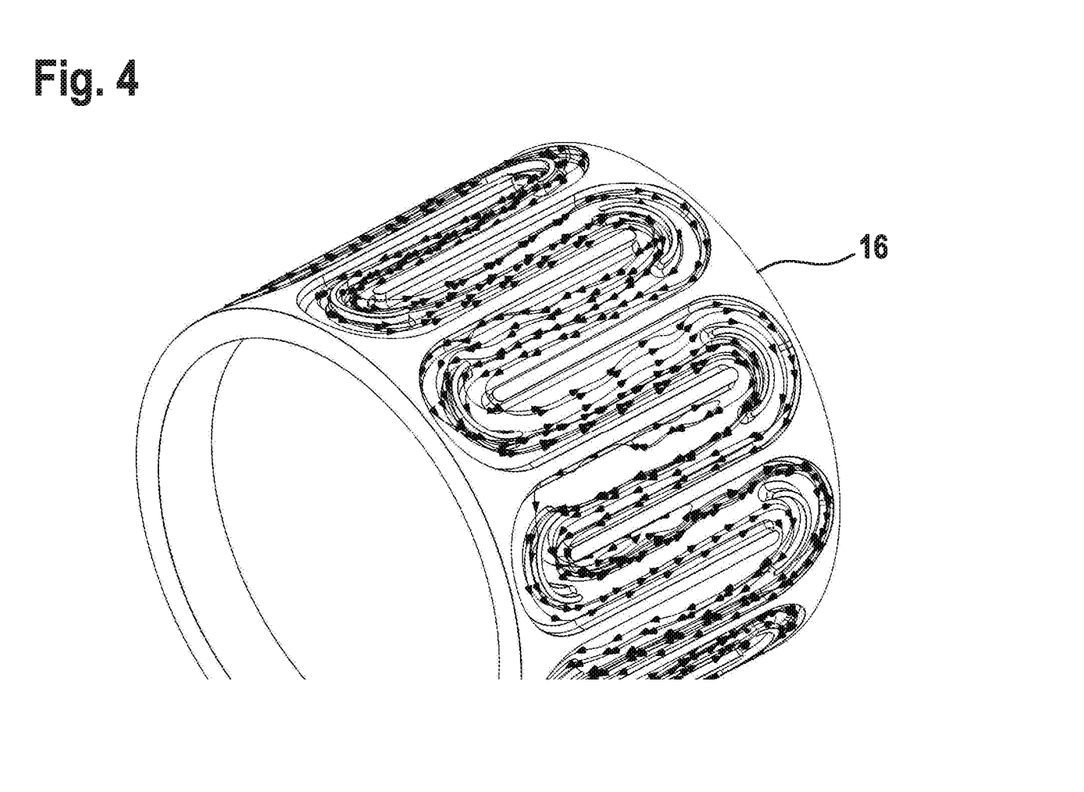
FIG. 4 shows an illustration of flow lines of a cooling fluid during operation of the electric machine.
Figure 5:
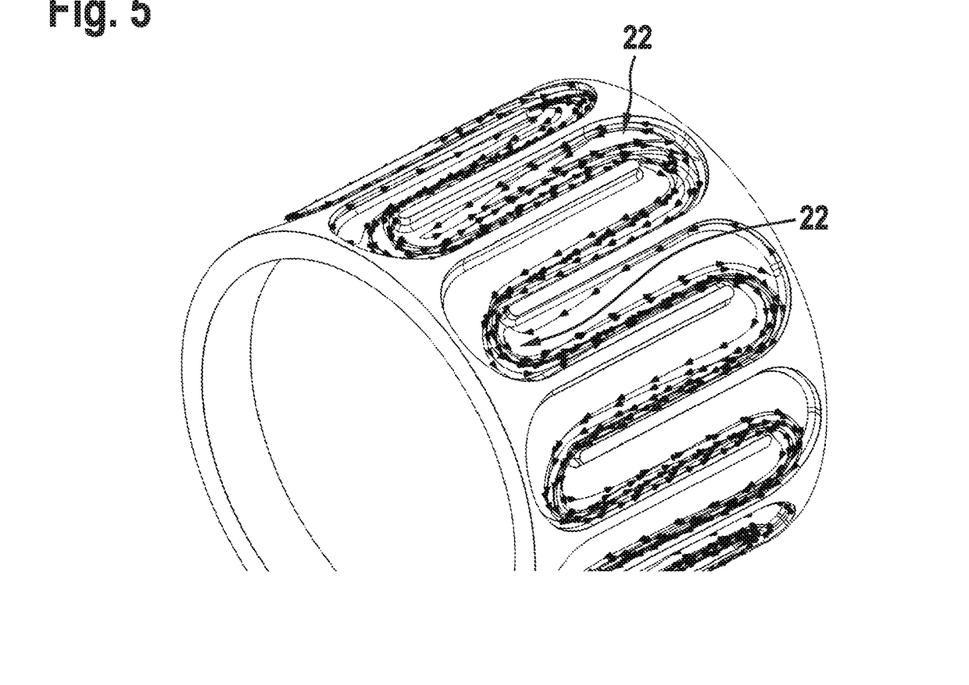
FIG. 5 shows an illustration corresponding to FIG. 4 during operation of a conventional electric machine according to the prior art.
Figure 6:
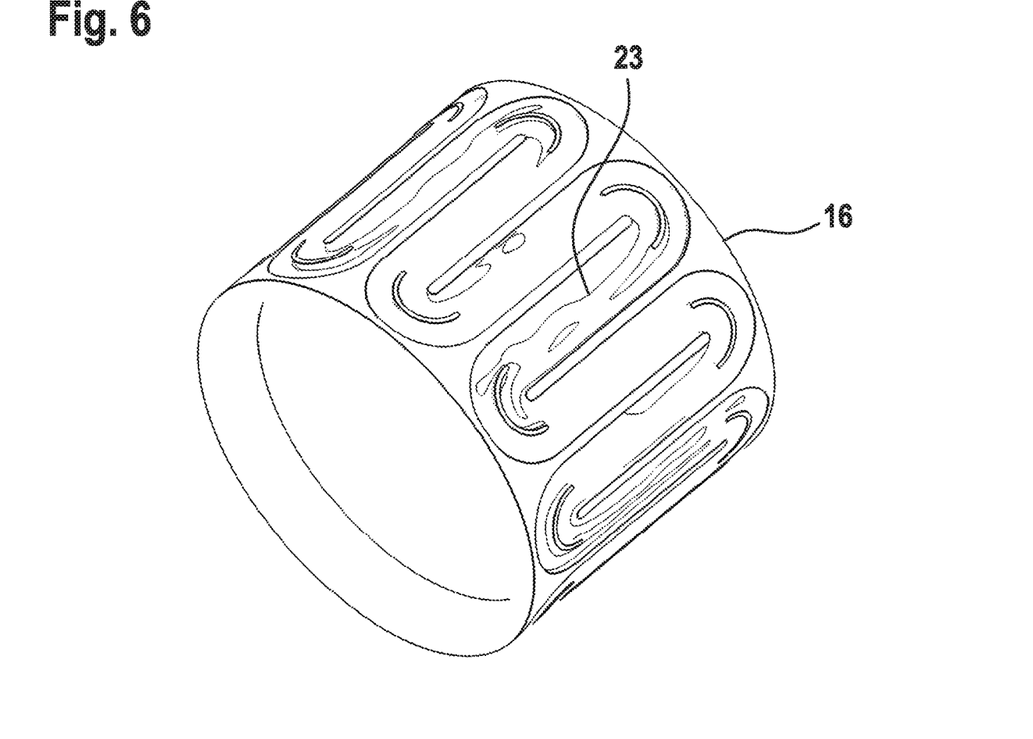
FIG. 6 shows an illustration of a pressure drop of the cooling fluid during operation of the electric machine.
Figure 7:
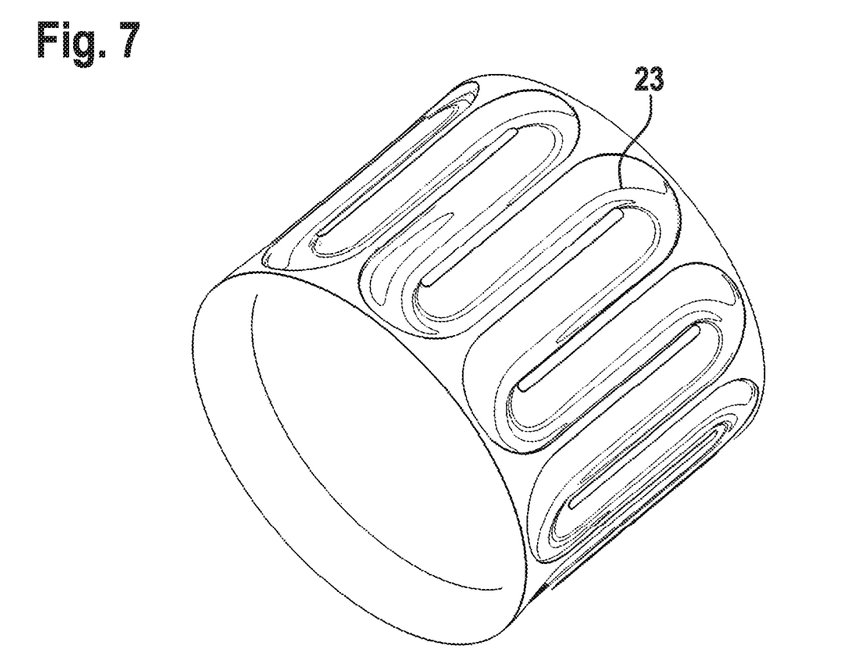
FIG. 7 shows an illustration corresponding to FIG. 6 during operation of the conventional electric machine.
Figure 8:
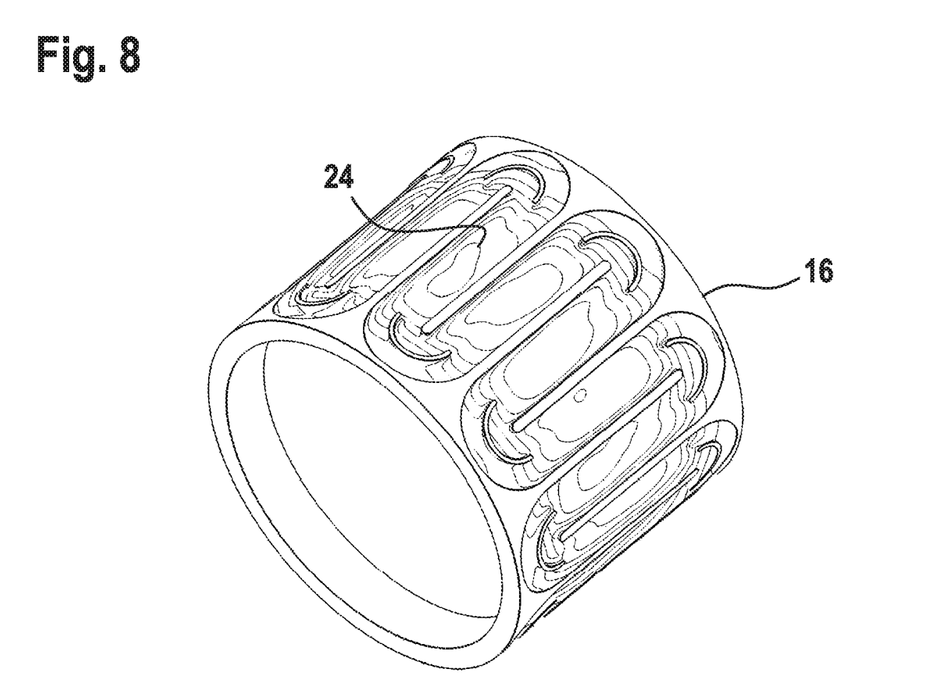
FIG. 8 shows an illustration of a temperature distribution during operation of the electric machine.
Figure 9:
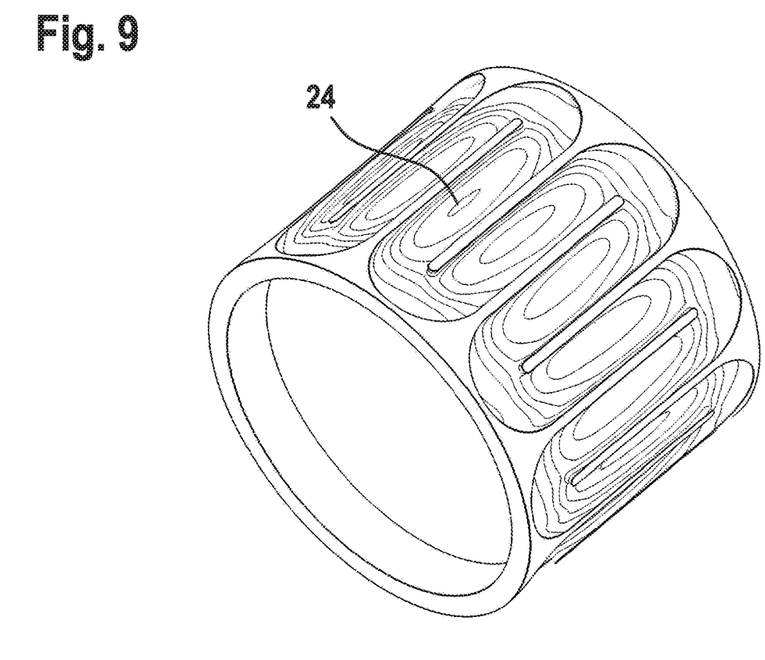
FIG. 9 shows an illustration corresponding to FIG. 8 during operation of a conventional electric machine according to the prior art.

FIG. 4, FIG. 6 and FIG. 8 are illustrations of different operating properties of the electric machine 1 in the case of an exemplary configuration with an inlet temperature of the cooling fluid of 70° C. and a volume flow of the cooling fluid of 6 l·min$^{-1}$. FIG. 5, FIG. 7 and FIG. 9 show the corresponding operating properties during operation of a conventional electric machine according to the prior art without guide elements 10.

FIG. 4 is an illustration of flow lines of the cooling fluid during operation of the electric machine 1. FIG. 5 is a corresponding illustration during operation of the conventional electric machine. It can be seen that, due to the division of the cooling path 9 into the cooling sub-paths 11, 12, flow separations which lead to turbulences 22 are significantly reduced.

FIG. 6 shows an illustration of a pressure drop of the cooling fluid during operation of the electric machine 1. FIG. 7 shows a corresponding illustration during operation of the conventional electric machine. In both drawings, isolines 23 of the pressure are shown. As can be seen, the isolines 23 in the electric machine 1 according to FIG. 6 run with much greater distances than in the conventional electric machine according to FIG. 7, which demonstrates the low pressure drop in the exemplary embodiment.

FIG. 8 shows an illustration of a temperature distribution at the inner housing element 16 during operation of the electric machine 1. FIG. 9 shows a corresponding illustration during operation of the conventional electric machine. In this case, isolines 24 of the temperature show the corresponding temperature distribution. As can be seen, due to the addition of the guide elements 11 in the electric machine 1, there is only an insignificant increase of the temperature at the inner housing element 16.

In the described exemplary configuration, the pressure drop across the cooling path is reduced from 16.2 kPa in the conventional electric machine to 5.2 kPa in the electric machine 1. This results in a reduction of the pressure drop by 67.7%. The following table shows, for each of the inner housing element 16, the outer housing element 17 and the press fit, a temperature at the location of the greatest heating $\vartheta_{max}$ and an average temperature $\vartheta_{avg}$ in both the conventional electric machine and the electric machine 1:

|  |  | Conventional electric machine | Exemplary embodiment with guide elements |
|---|---|---|---|
| Inner housing element | $\vartheta_{max}$ | 87.04° C. | 87.17° C. |
|  | $\vartheta_{avg}$ | 79.76° C. | 79.78° C. |
| Outer housing element | $\vartheta_{max}$ | 81.56° C. | 81.73° C. |
|  | $\vartheta_{avg}$ | 76.41° C. | 76.54° C. |
| Press fit | $\vartheta_{max}$ | 87.04° C. | 87.17° C. |
|  | $\vartheta_{avg}$ | 82.99° C. | 83.22° C. |

As can be seen, the addition of the guide elements 11 leads only to a marginal temperature increase during operation of the electric machine 1.

Hereinafter, further exemplary embodiments of a stator housing 2 will be described, wherein equivalent or functionally similar components are provided with identical reference signs.

Figure 10:
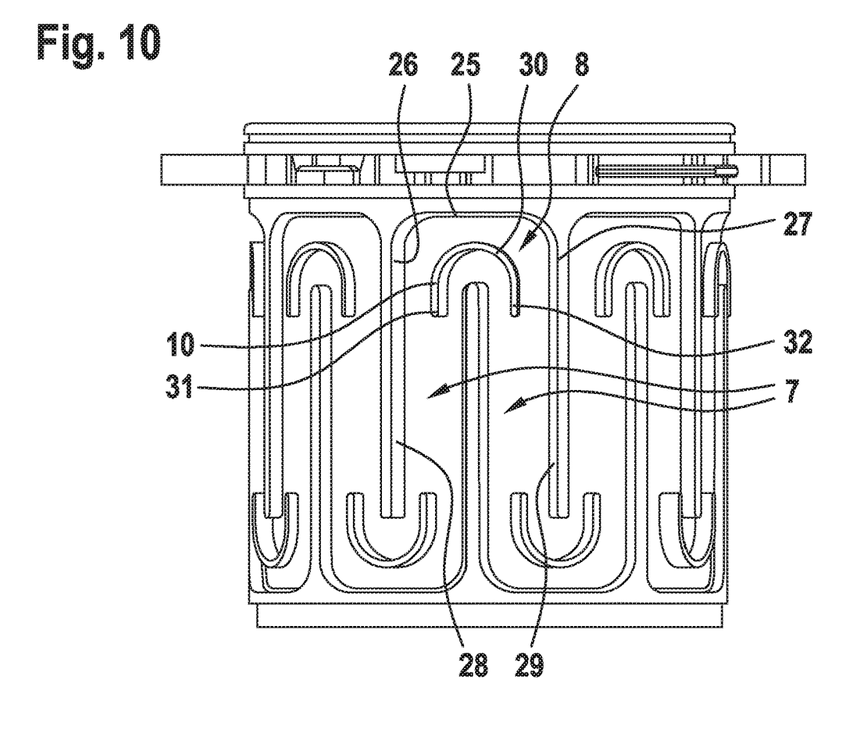
FIGS. 10 to 12 each show a plan view of a further exemplary embodiment of the stator housing according to the invention.

FIG. 10 shows a plan view of a further exemplary embodiment of a stator housing 2, which corresponds to the first exemplary embodiment apart from the deviations described hereinafter.

Firstly, the deflection portions 8 of the stator housing 2 each have a first outer edge portion 25 running transverse to the direction of extent of the main portions 7 and two second outer edge portions 26, 27, which connect the outer edge portion 25 to edges 20, 29 of the main portions 7. The outer edge portions 26, 28 are rounded towards the first outer edge portion 25 and extend along the direction of extent of the main portions 7.

The guide element 10, in addition to the circular arc-shaped portion 30, also has two straight extension portions 31, 32 connected to corresponding ends of the circular arc-shaped portion 30 and extending into the main portion 7. The extension portions 31, 32 in other words form tangential continuations of the circular arc-shaped portion 30.

Figure 11:
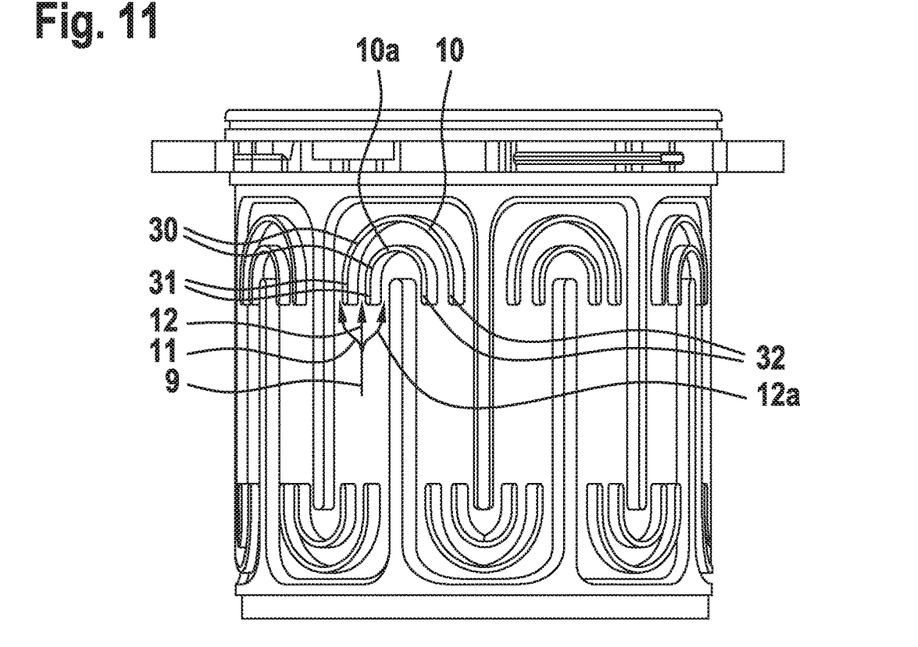

FIG. 11 is a plan view of a further exemplary embodiment of a stator housing 2, which corresponds to the exemplary embodiment according to FIG. 10 apart from the deviations described hereinafter. In this exemplary embodiment a second guide element 10a is additionally provided and separates the cooling path 9 into a further cooling path 12a. Consequently, the guide elements 10, 10a separate the cooling path 9 into a total of three cooling paths 11, 12, 12a. In this case, the circular arc-shaped portions 30 of the guide elements 10, 10a are arranged coaxially to one another, and the extension portions 31, 32 of the guide elements 10, 10a are arranged parallel to one another.

Figure 12:
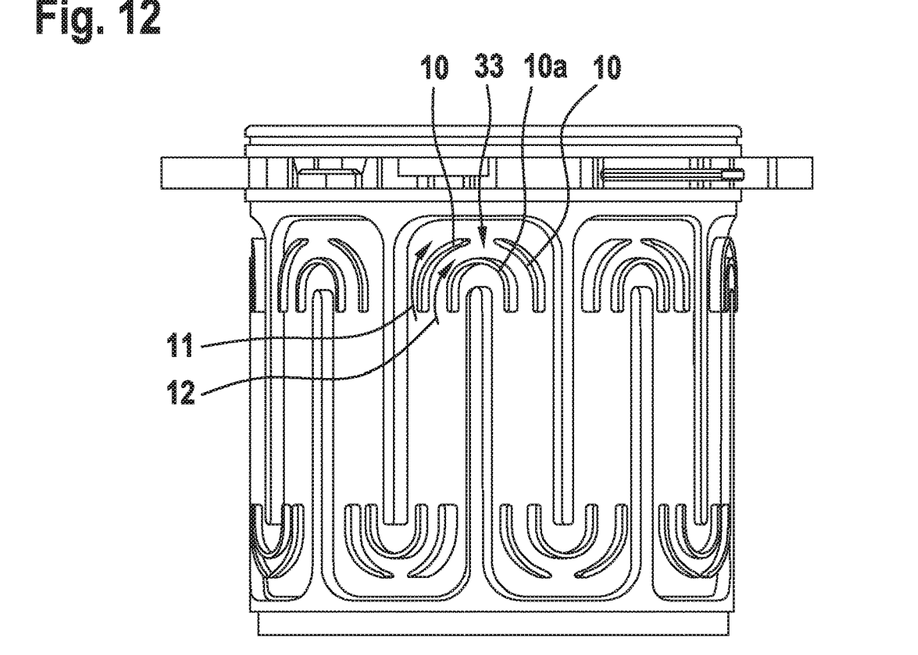

FIG. 12 is a plan view of a further exemplary embodiment of a stator housing 2, which corresponds to the exemplary embodiment according to FIG. 11 apart from the deviations described hereinafter. In this exemplary embodiment the first guide element 10 has a central aperture 33, which fluidically connects the cooling subchannels 11, 12 to one another.

Simulation results for further exemplary embodiments of the electric machine 1 which each have a stator housing 2 according to FIGS. 10, 11 and 12 will be described hereinafter. The exemplary configuration on which the simulation results are based differs from that on which the table shown previously was based. Furthermore, simulation results of a conventional electric machine will be described, the stator housing of which corresponds to one of the exemplary embodiments according to FIG. 10, 11 or 12, but does not have any guide elements 10, 10a. The illustration of the simulation results is based on the following operating points:

|  | Operating point 1 | Operating point 2 | Operating point 3 |
|---|---|---|---|
| Power at an A-side bearing in W | 107 | 70 | 67 |
| Power at a B-side bearing in W | 63 | 38 | 36 |
| Motor losses in W | 2221 | 2221 | 2442 |
| Volume flow in $l \cdot min^{-1}$ | 10 | 10 | 6 |
| Cooling fluid temperature in ° C. | 25 | 65 | 70 |

The simulation results for the temperatures $\vartheta_{max}$ and $\vartheta_{avg}$ and the pressure drop $\Delta p$ for operating point 1 are:

|  | $\vartheta_{avg}$ | $\vartheta_{max}$ | $\Delta p$ |
|---|---|---|---|
| Conventional electric machine | 34.48 | 37.54 | 20.44 |
| Exemplary embodiment according to FIG. 10 | 36.04 | 40.00 | 7.83 |
| Exemplary embodiment according to FIG. 11 | 35.21 | 39.58 | 10.59 |
| Exemplary embodiment according to FIG. 12 | 35.29 | 39.27 | 9.88 |

The simulation results for the temperatures $\vartheta_{max}$ and $\vartheta_{avg}$ and the pressure drop $\Delta p$ for operating point 2 are:

|  | $\vartheta_{avg}$ | $\vartheta_{max}$ | $\Delta p$ |
|---|---|---|---|
| Conventional electric machine | 73.32 | 76.06 | 15.05 |
| Exemplary embodiment according to FIG. 10 | 74.26 | 77.69 | 5.75 |

-continued

|  | $\vartheta_{avg}$ | $\vartheta_{max}$ | $\Delta p$ |
|---|---|---|---|
| Exemplary embodiment according to FIG. 11 | 73.78 | 77.37 | 7.39 |
| Exemplary embodiment according to FIG. 12 | 73.92 | 77.40 | 7.00 |

The simulation results for the temperatures $\vartheta_{max}$ and $\vartheta_{avg}$ and the pressure drop $\Delta p$ for operating point 3 are:

|  | $\vartheta_{avg}$ | $\vartheta_{max}$ | $\Delta p$ |
|---|---|---|---|
| Conventional electric machine | 81.67 | 85.65 | 6.34 |
| Exemplary embodiment according to FIG. 10 | 83.40 | 88.38 | 2.33 |
| Exemplary embodiment according to FIG. 11 | 82.55 | 87.90 | 3.06 |
| Exemplary embodiment according to FIG. 12 | 82.85 | 87.95 | 2.87 |

In accordance with a further exemplary embodiment of the stator housing 2, the guide element 10 according to FIG. 10 or the guide elements 10, 10a according to FIG. 11 or FIG. 12 is/are used in a deflection portion 8 in the form of a sector of a ring according to the first exemplary embodiment.

In accordance with a further exemplary embodiment of the electric machine 1, the main portions 7 extend in the circumferential direction, and the deflection portions 8 extend in the axial direction. The aforementioned embodiments may be transferred accordingly to a design of this kind of the stator housing 2.

Figure 13:
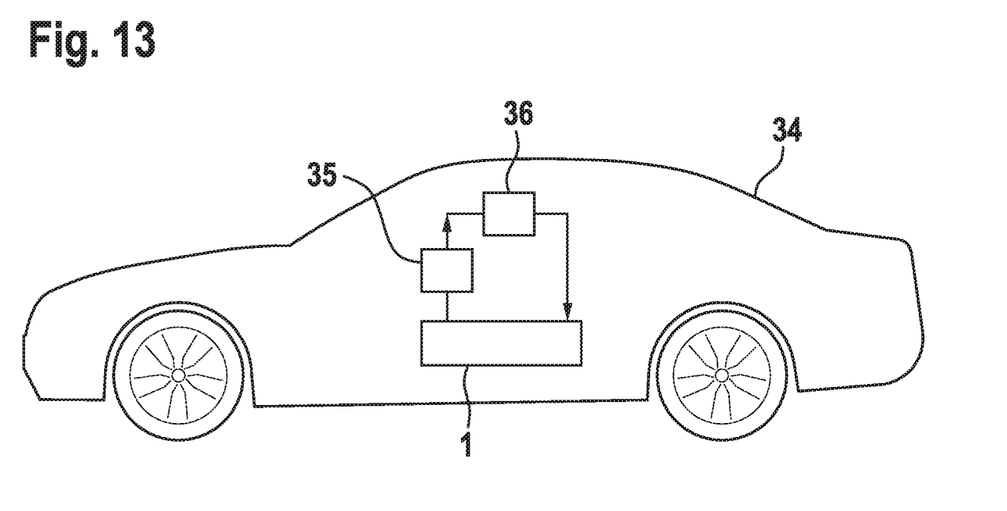
FIG. 13 shows a schematic diagram of an exemplary embodiment of a vehicle according to the invention.

FIG. 13 is a schematic diagram of an exemplary embodiment of a vehicle 34.

The vehicle 34 comprises an electric machine 1 according to the previously described exemplary embodiments, which electric machine is designed to drive the vehicle 34. In addition, the vehicle 34 comprises a heat exchanger 35 and a pump 36, which form a closed cooling circuit with the cooling channel 6 (see FIG. 1) of the electric machine 1.

The invention claimed is:

1. A stator housing for an electric machine, comprising:
   a cooling channel through which a cooling fluid is configured to flow and which includes:
   a plurality of main portions extending in an axial direction or in a circumferential direction,
   deflection portions connecting adjacent main portions in such a way that a meandering cooling path is formed, and
   a guide elements, each being formed within each of the deflection portions to separate the cooling path into two cooling sub-paths,
   wherein the each of the guide elements has a gap formed at a center of each of the guide elements and located at each end of the stator housing in the axial direction, the gap entirely separating the guide element to two sections and fluidically connecting the two cooling sub-paths one another.

2. The stator housing according to claim 1, further comprising:
   a second guide element is formed within each of the deflection portions to separate the cooling path into a further cooling sub-path.

3. The stator housing according to claim 2, wherein the second guide element runs coaxially and/or parallel to the first guide element.

4. The stator housing according to claim 2, wherein each of the guiding elements of the deflection sections has one gap.

5. The stator housing according to claim 2, wherein the second guiding element of the deflection section separates the cooling sub-path in a fluid-tight fashion such that a cooling fluid flow transverse to a flow direction of the cooling fluid trough the cooling channel is prevented.

6. The stator housing according to claim 1, wherein the guide element follows a course of an outer edge and/or an inner edge of the cooling channel.

7. The stator housing according to claim 1, wherein the guide element is circular arc-shaped at least in some sections.

8. The stator housing according to claim 1, wherein the guide element or the guide elements is or are arranged centrally in the cooling channel.

9. The stator housing according to claim 1, wherein the guide element extends into the main portions connected by the deflection portion to an extent of at most 25% of a length of the main portions connected by the deflection portion.

10. The stator housing according to claim 1, wherein the deflection portions are provided in a form of a sector of a ring.

11. The stator housing according to claim 1, wherein each of the deflection portions has a first outer edge portion running transverse to a direction of extent of the main portions and second outer edge portions which connect the first outer edge portion to edges of the main portions connected by the deflection portions.

12. The stator housing according to claim 1, wherein the man portions and the deflection portions are formed by a cavity in the stator housing.

13. The stator housing according to claim 12, which comprises an inner housing element and an outer housing element, wherein the inner housing element is arranged coaxially within the outer housing element, and wherein the cavity is formed in one of the housing elements.

14. The stator housing according to claim 12, wherein the cavity is milled into a material of the stator housing.

15. An electric machine for a vehicle, comprising the stator housing according to claim 1 and a stator which is arranged within the stator housing.

16. A vehicle, comprising the electric machine according to claim 14 which is designed to drive the vehicle.

* * * * *